S. G. RANDALL.
Disk-Harrow Cultivator.

No. 161,060. Patented March 23, 1875.

UNITED STATES PATENT OFFICE.

SILAS G. RANDALL, OF GREENE, NEW YORK.

IMPROVEMENT IN DISK HARROW-CULTIVATORS.

Specification forming part of Letters Patent No. 161,060, dated March 23, 1875; application filed February 26, 1875.

*To all whom it may concern:*

Be it known that I, SILAS G. RANDALL, of Greene, in the county of Chenango and State of New York, have invented certain new and useful Improvements in Disk Harrow-Cultivators, of which the following is a specification:

My improvements relate to that class of combined harrows and cultivators in which revolving disks set at an angle to the line of draft are employed; and my object is so to construct the machine as thoroughly to work the land, and effectually to prevent clogging of the machine.

The improvements claimed will hereinafter be specified.

Figure 1:
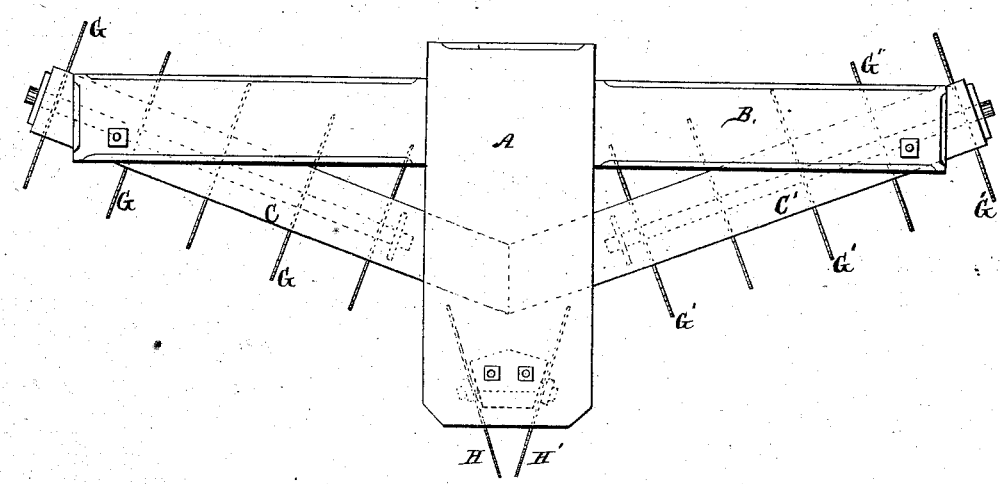
Figure 2:
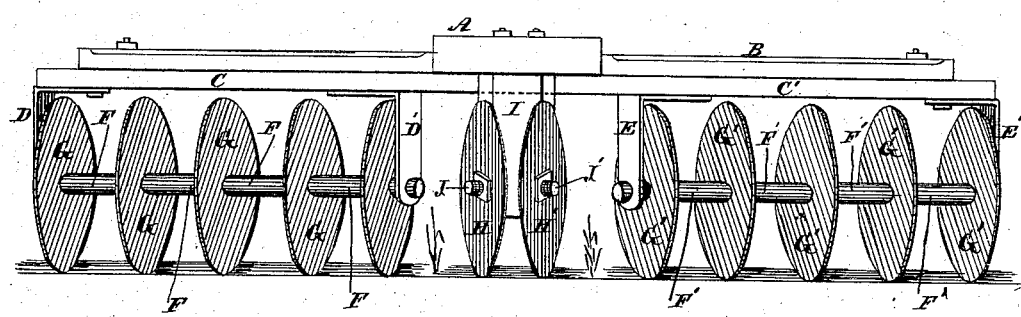

In the accompanying drawings, which show so much of a machine as is necessary to illustrate my invention, Figure 1 represents a plan or top view, and Fig. 2 a front elevation.

A main or draft frame is composed in this instance of a central portion formed by a plank, A, a transverse beam, B, and diagonal bars C C', connecting the ends of the transverse piece B with the central plank A, the various parts being firmly united by suitable fastenings. The machine is to be provided with a seat for the driver, and draft attachment of well-known construction. A downhanger, D, is secured to the diagonal bar C at its outer end, and a similar downhanger, D', is secured to this bar at some distance from the center of the machine, while corresponding downhangers E E' are similarly attached to the diagonal bar C. A shaft, F, journaled in bearings in the lower ends of the downhangers D D', so as to revolve freely, carries a series of disks, G, which revolve with the shaft, and a corresponding shaft, F', carrying a series of disks, G', turns in the downhangers E E'. These shafts F F', it will be observed, are, respectively, parallel with the bars C and C', and diverge from points on either side of the center of the frame backward. This inclination of the shafts gives the desired inclination to the disks G and G', which are thus presented to the soil at an angle to the line of draft with the adjacent or inner disks of the two series some distance apart. Beneath the front of the central plank A are attached two disks, H H', at an angle to the line of draft, the direction in which either inclines being the reverse of that of the series of disks on the corresponding side of the machine. These leading disks H H' are secured to the main frame in this instance by a downwardly-projecting short post or arm, I, secured to the plank A, to which arm are secured inclined stud-axles J J', upon which the disks revolve.

In operation, the leading disks H H' turn the earth from the center of the machine on each side, while the soil is moved or turned toward the center by the series of disks G G', the inner disk of each series being far enough removed from each other to allow the earth to be moved inward without any possibility of clogging. Thus the land is thoroughly worked to the width of the machine, the soil moved outward by the leading disks being lapped by that moved inward by the series of disks which follow.

I claim—

In a disk-cultivator, the combination, substantially as hereinbefore set forth, of a frame, two series of revolving disks arranged diagonally to the line of draft, with their axes inclined thereto, and leading disks interposed between the two series, and arranged to throw the earth in the opposite direction therefrom.

In testimony whereof I have hereunto subscribed my name.

SILAS G. RANDALL.

Witnesses:
L. T. DARBY,
DANIEL B. BARNETT.